March 3, 1964   K. B. BREDTSCHNEIDER   3,123,090
PRESSURE RELIEF GATE VALVE
Filed Aug. 3, 1961
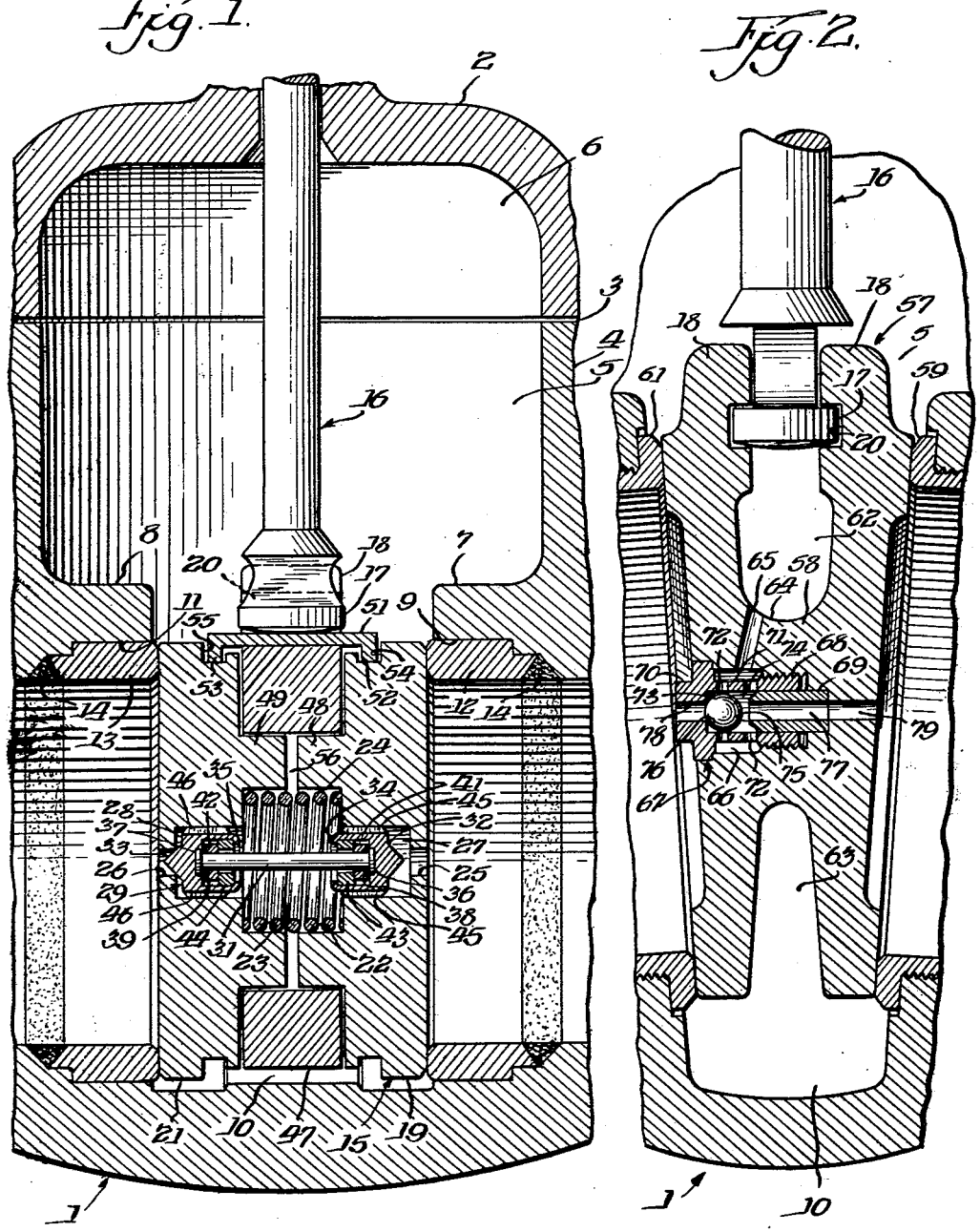
Inventor:
Kurt B. Bredtschneider

United States Patent Office 3,123,090
Patented Mar. 3, 1964

3,123,090
PRESSURE RELIEF GATE VALVE
Kurt B. Bredtschneider, Chicago, Ill., assignor to Crane Co., Chicago, Ill., a corporation of Illinois
Filed Aug. 3, 1961, Ser. No. 129,178
1 Claim. (Cl. 137—112)

This invention relates generally to a gate valve construction, and, more particularly, it is concerned with an automatic fluid pressure relief means of a character hereinafter referred to in greater detail.

In order to acquire a better appreciation of the problems in the field necessitating the use of this type of construction, it should be understood that one of the major problems heretofore existing especially in connection with gate valves has been the fact that it becomes necessary on occasion to relieve the excessive fluid pressures building up in the valve casing and bonnet when the valve is in its closed position and the valve is heated subsequently.

Let it be assumed, for example, the valve shown in the figure hereinafter referred to, but without the pressure relieving element of this invention in the closure member of this double disc gate valve, is closed tight and as a result during such closing of the valve line fluid from the pipe line has been trapped in the valve casing and bonnet chambers. When the trapped fluid becomes heated for any one of a variety of reasons, it will be apparent that expansion of the fluid and a tremendous rise in pressure can and does take place very quickly in said casing and bonnet chambers. In this connection, it should be noted that certain fluids as petroleum based fluids, for example, for each degree increase in the temperature thereof, a pressure increase of 75 pounds per square inch will result for each degree rise of temperature. Obviously, when the fluid pressure becomes sufficiently high and is firmly retained in valve and bonnet chambers surrounding the closed disc or gate, the valve can easily be damaged, even to the extent of actual bursting occurring and other damage to valve parts even if valve rupture itself does not occur.

Therefore, it is an important object of this invention whereby a mechanism and relief means is employed to provide an automatic equalizer duct between the valve chamber and one of the casing passages, either to the inlet or outlet depending on which contains the higher pressure so that fluid can never be trapped within the valve chamber. Thus, the relief means establishes a fluid passageway at all times between the valve chamber to the high pressure side of the valve and consequently the pressure cannot increase beyond this.

It is another important object to provide a type of relief means in which the response of the relieving mechanism takes place automatically so as to avoid the necessity for manual control or care.

It is a further object of the invention to provide an automatic fluid relief mechanism which can easily be built into stock valves both economically and conveniently without the necessity or requirement for special equipment or substantial changes in patterns or tooling.

A further object is to provide for a fluid pressure relief means in which the pressure responsive element is freely movable in response to the occurrence of fluid pressure changes in the piping system.

A still further object of the mechanism is to provide for a relief mechanism which is relatively easily replaceable and is repairable without excessive costs being involved.

Other objects and advantages of the invention will become more readily apparent upon proceeding with the specification read in light of the accompanying drawings, in which:

FIG. 1 is a fragmentary sectional assembly view of a gate valve disclosing a preferred embodiment of my invention; and FIG. 2 is a fragmentary sectional assembly view of a modified form of gate valve employing the invention.

Similar reference numerals refer to similar parts throughout the several views.

Referring now to FIG. 1, a valve body or casing generally designated 1 is shown fragmentarily in cross-section, and, although not specifically shown, it is provided with the usual end connecting means for attachment to the usual pipe line (also not shown). At its upper portions, the valve is provided with a bonnet 2 mounted in fluid sealing relation at gasket 3 to the casing portion 4 of the said body. The inner portions of the body 1 as at 5 and at 6 are provided with the connected casing and bonnet chambers as illustrated. Annularly extending inward of the casing are the intergral projecting annular portions 7 and 8 formed with respective hollow or recessed portions 9 and 11 so formed to receive the body seat rings 12 and 13. The latter members are preferably, although not necessarily, welded as at 14 to the outer end portions 7 and 8 of the casing. Of course, the seat rings may be dispensed with and made integral with casing portions 7 and 8, if desired. Within the central portion of the valve casing chamber 5, the valve gate or closure member generally designated 15 is mounted for permitting its reciprocating movement therewithin by means of such actuating means as an axially movable stem generally designated 16. The latter member is attached at its neck 20 by the usual T-head 17 engaging at its inner end the oppositely disposed inturned flanged portions 18 of the closure member 15.

In this particular embodiment, the gate closure member is made in two halves 19 and 21 formed with a hollow central chamber at 22 and 23 whereby to receive the coiled spring 24 therebetween to maintain the disc halves 19 and 21 in resilient spaced-apart relation. It will also be noted that each half portion 19 and 21 of the valve closure member is provided with outer apertures 25 and 26 communicating at their inner ends with enlarged recessed or chamber portions 27 and 28 for the pressure responsive element of this invention, generally designated 29. The latter member consists of a central horizontally disposed shaft 31 joining the head ends 32 and 33 and having a locking portion at 34 and 35 enclosing at each end the respective collars of the rod 31 at 41 and 42. End clearances 36 and 37 are provided for stem 31. It will be appreciated that the head portions 32 and 33 alternatively function as closure means as more clearly disclosed hereinafter. The stem 31 is preferably attached to bushing 41 and 42 by weld 38 and 39 and is positioned within annular member 43 and 44, each of the latter members being held thereto by the inwardly directed annular flange portions 34 and 35. As previously indicated, since the pressure responsive member 29 is axially movable horizontally to alternatively engage the inner seat portions defining the apertures 25 and 26 in order to guide said member 29, a plurality of oppositely disposed guide ribs 45 and 46 for expediting such guiding are preferably used as indicated. Thus line fluid pressure is enabled to move between the said longitudinally extending ribs 45 and 46, functioning in the manner hereinafter described in greater detail. To serve as a means for carrying and supporting the disc halves 19 and 21, an annular member 47 is disposed to engage the disc hub portions 48 and 49 of the respective disc halves to permit the desired lateral or expansive movement in response to line fluid pressures as well as that spread apart positioning effected by the coiled spring 24. At the upper portion, the disc halves 19 and 21 are held in guided relation by means of an arcuately extending clip member 51 having the inturned flanged portions 52 and 53 relatively loosely fitted within the annular grooves 54 and 55 to permit predetermined limited movement therebetween. The axially movable stem 16 is suitably actuated in the usual manner to effect reciprocating movement of the closure member 15 by any suitable manual or power operated means, such as stem threads (not shown) or quick opening leverage mechanism, all of which are well known to those skilled in the art.

The valve as illustrated in FIG. 1, but without the pressure responsive mechanism of this invention, has been closed, and ordinarily by such closure the line fluid will become trapped within the bonnet chamber 6 and the body chamber 5 as well as in the lower chamber portion 10 of the casing. As a result, such completely enclosed or trapped fluid under temperature applied from any source will expand very substantially. Under these circumstances, but with the pressure responsive mechanism installed as illustrated in FIG. 1, the pressure of such fluid also present in the annular chamber 56 between the disc halves, and in the respective chambers defined at 22 and 23, will remain the same as the pressure of the high pressure side of the valve body. For example, with the high pressure side of the valve body to the right-hand side, as illustrated in FIG. 1, the pressure responsive member generally designated 29 will have moved to the left with the head end member 33 of shaft 31 in seated position and head end member 32 in the unseated position shown. Thus forming a continuous open passageway or duct past the annularly disposed ribs 45, chamber 27 and outwardly into the aperture 25 into the valve casing portion 9 occupied by the seat ring 12. On the other hand, if the origin of the fluid pressure condition within the valve should be in the direction reverse from that above indicated, then beneficial flow will occur past the ribs 46 and outwardly into the chamber 28 and through the reduced aperture 26 into the body chamber portion 11 occupied by the body seat ring 13. Therefore, under no circumstances, is it possible for the fluid pressure existing within the interconnected valve and bonnet chambers 5, 6, and 10, with the closure member 29 seated to increase beyond that of the line pressure, since a relief outlet is alternatively present and provided for fluid pressure relief in such manner by the release of the otherwise trapped fluid escaping past the open end portion of the freely movable pressure responsive check closure member 29. Thus a comparatively simple, economical, and yet very effective and trouble-free means has been provided to overcome or relieve an extremely dangerous condition heretofore existing within the valve casing and bonnet, which condition obviously would adversely affect the entire pipe line or even a processing system in a very costly way.

It will also be understood that while a reciprocally movable pressure relief member has been shown and described and also that the main valve closure member has been indicated as being of the spring loaded parallel seat type, such structural limitation is not necessary. The invention is capable of application to other forms of main valve closure members, such as the tapered seat type and in the latter connection attention is now directed to FIG. 2 in which such modified embodiment is illustrated. Here, the main valve closure member generally designated 57 is joined at its central portion integrally by means of tie or strut 58. The closure member, which is reciprocally movable, is of tapered configuration seating on the inclined body seat rings 59 and 61, and being held in operatively mounted relation to the actuating stem 16 by means of a T-head construction as at 17 which engages the inturned flanges 18 in substantially the same manner as described in connection with the previous figure. The closure member 57 is of the type known to the trade as the flexible disc construction and it fits snugly in tapered relation on the body seat rings 59 and 61 in the valve closed position as illustrated. Thus, here, similarly, it will now become apparent that the body chamber 5 and a lower portion thereof as referred to at 10, allows for the trapping of line fluid when the valve is closed as shown. In order to pressure relieve the said chambers 5 and 10 and also that inner portion of the communicating chamber indicated at 62 and at 63 in this modification, the central strut 64 of said closure gate is provided with a transverse connecting passage 65 which is in communication with the inner chamber 66 of said strut. Within said latter chamber, a suitably ported cage member generally designated 67 is threadedly mounted as at 68 thereby to position the annular seat member 69 outwardly of the ported portion 71 of said cage member, the ports transversely extending being indicated at 72 and being annularly distributed. The cage is assembled with the closure 57 by gripping the extension at 70. A ball closure member or sphere 73 is provided within said cage member and moves freely in response to fluid pressure within the chamber 74 defined by the apertured wall 71. The ball seats as indicated at either outer end of the chamber 74 as at 75 or 76 respectively moving a distance defined by the spaced apart seats. Each of the latter seat portions is provided with ports 77 and 78, the ports 77 being in communication with the closure member port 79, and the casing coupled by the body seat ring 59. Fluid pressure within the body chambers 5 and 10 cannot increase at any time when the main closure member 57 is seated as shown in the illustration of FIG. 2 because a duct is automatically formed by the relief mechanism between the interior chambers of the valve and the line pressure side or right-hand side of the valve within seat ring 59. Under these conditions, the position of the closure member 73, as illustrated, is seated at 76 by the line pressure to the low pressure side of the valve and connecting piping and a passageway is formed so as to connect the fluid within chambers 5 and 10, past the T-head 17 into the annular chambers 62 and 63 thence into the port 65 to enter the cage 67 through the ports 77, 79 into the area occupied by the body seat ring 59 to the pipe line (not shown). In the event that there is a reversal flow due to a condition from the opposite side of the valve in that the lesser pressure is in the area defined by the body seat ring 59, the ball closure member 73 will then be moved toward the right by the higher fluid pressure existing on the upstream side and in the casing portion defined by the body seat ring 61, to engage the annular valve seat 75 and thereby providing an equalizing duct for the fluid in chambers 5, 10, 62, and 63 and also in the bonnet chamber (not shown) through the now open port 78 into the casing portion defined by the said seat ring 61 and thence into the connecting pipe line (also not shown).

It will be clear that in each case the responsive means employed to prevent an accumulation of fluid pressure between the discs and the respective body and bonnet chambers will take place automatically and yet there will be no interference with the proper functioning of the main valve closure member 57 in the course of its normal operation. It will also be apparent that main valve discs such as 15 and 57 of regular form may easily be taken from regular stock and easily and economically be rendered suitable for effecting the beneficial relief function hereinabove described.

While only two embodiments of the invention have been illustrated and described herein, it will be clear that falling within the purview of the appended claim many related structures may be used defined by such claim.

I claim:

In an automatic relief type of double disc gate valve, a gate closure member therefor, the combination of a casing for said closure member, the casing having a central valve chamber with parallel valve seats for receiving said closure member and having an inlet passage and an outlet passage communicating with said valve chamber, the said gate closure member being reciprocally movable across the said inlet and outlet passages, the said gate closure member comprising a pair of spaced apart circular disc halves with parallel seat contact surfaces and with relieved portions oppositely disposed in juxtaposition, said gate closure member carrying pressure relief means therewithin in a chamber formed by said disc relieved portions, said relief means comprising a freely movable closure member guided for reciprocal movement in said relieved portion chamber and responsive to fluid flow through the said relieved portion chamber, the latter chamber having annular stepped portions formed between said disc halves and having substantially axially aligned ports leading therefrom defined at inner portions thereof by annular valve seats, the said freely movable closure member being reciprocally movable between said latter seats, the said freely movable closure being closely guided within said stepped annular portion of the said relieved portion chamber immediately adjacent said annular valve seats, the said guide means comprising oppositely disposed spaced apart ribs slidably engaging said stepped annular portion of said relieved portion chamber immediately adjacent said annular valve seats, the said gate closure member having a centrally disposed renewable shaft of substantially reduced diameter connecting spaced apart portions of the said freely movable closure member adjacent said seats, said freely movable closure member alternatively connecting said annular valve seats whereby relief means is established optionally to provide an equalizing duct between the valve chamber and either the casing inlet passage or the casing outlet passage depending on which passage contains the higher fluid pressure.

References Cited in the file of this patent

UNITED STATES PATENTS

| | | |
|---|---|---|
| 1,932,471 | McKellar | Oct. 31, 1933 |
| 2,351,775 | McMurry | June 20, 1944 |
| 2,670,752 | Laurent | Mar. 2, 1954 |
| 2,718,233 | Krummel | Sept. 20, 1955 |
| 2,861,771 | Bryant | Nov. 25, 1958 |
| 2,950,897 | Bryant | Aug. 30, 1960 |

FOREIGN PATENTS

| | | |
|---|---|---|
| 506,418 | Canada | Oct. 12, 1954 |
| 1,213,078 | France | Oct. 26, 1959 |